United States Patent
Remmert et al.

(10) Patent No.: US 6,733,023 B2
(45) Date of Patent: May 11, 2004

(54) SUSPENSION

(75) Inventors: Heiner Remmert, Paderborn (DE); Andreas Rohde, Braunschweig (DE)

(73) Assignee: Benteler Automobiltechnik GmbH, Paderborn (DE)

(*) Notice: Subject to any disclaimer, the term of this patent is extended or adjusted under 35 U.S.C. 154(b) by 96 days.

(21) Appl. No.: 10/077,598

(22) Filed: Feb. 15, 2002

(65) Prior Publication Data

US 2002/0109328 A1 Aug. 15, 2002

(30) Foreign Application Priority Data

Feb. 15, 2001 (DE) .......................... 101 06 915

(51) Int. Cl.$^7$ .......................... B60G 13/00; B60G 15/02
(52) U.S. Cl. .......................... 280/124.179; 280/124.155; 280/124.147; 267/179
(58) Field of Search ............ 280/124.147, 124.155, 280/124.179, 124.142, 124.141; 267/220, 33, 166, 169, 170, 179, 286, 221–226, 180, 166.1

(56) References Cited

U.S. PATENT DOCUMENTS

| | | | | |
|---|---|---|---|---|
| 2,162,828 A | * | 5/1939 | Slack ................. | 280/124.141 |
| 3,086,792 A | * | 4/1963 | Schultz ............... | 280/124.142 |
| 4,120,489 A | * | 10/1978 | Borlinghaus .......... | 267/166.1 |
| 4,462,608 A | * | 7/1984 | Lederman ............. | 267/33 |
| 5,149,069 A | * | 9/1992 | Hein ................. | 267/33 |
| 5,249,781 A | * | 10/1993 | Wohler ............... | 267/33 |
| 5,467,970 A | * | 11/1995 | Ratu et al. .......... | 267/220 |
| 5,467,971 A | * | 11/1995 | Hurtubise et al. ..... | 267/220 |
| 5,470,049 A | * | 11/1995 | Wohler et al. ........ | 267/172 |
| 5,788,262 A | * | 8/1998 | Dazy et al. .......... | 267/220 |
| 6,126,155 A | * | 10/2000 | Smith et al. ......... | 267/220 |
| 6,149,171 A | * | 11/2000 | Bono et al. .......... | 280/124.179 |
| 6,155,544 A | * | 12/2000 | Solomond et al. ...... | 267/220 |
| 6,254,072 B1 | * | 7/2001 | Bono et al. .......... | 267/220 |

FOREIGN PATENT DOCUMENTS

JP 56046128 * 4/1981

* cited by examiner

*Primary Examiner*—Ruth Ilan
(74) *Attorney, Agent, or Firm*—Henry M. Feiereisen (57) ABSTRACT

A suspension, includes a load-carrying spring having one end indirectly supported via a spring washer by a component of a vehicle body of a motor vehicle and another end indirectly supported via a second spring washer by a wheel support assembly of the motor vehicle. Disposed at the one end of the load-carrying spring is a cup-shaped receptacle, and at the other end an abutment which has a stop surface. A slave spring is arranged in coaxial relationship to the load-carrying spring and has one end received in the receptacle and another end intended for engagement with the stop surface of the abutment. The receptacle and/or the abutment has a radially outwardly extending support ring for at least partially engaging behind the respective one of the spring washers at a side distal to the load-carrying spring to form a pre-fabricated unitary structure with the load-carrying spring.

17 Claims, 5 Drawing Sheets

SUSPENSION

CROSS-REFERENCES TO RELATED APPLICATIONS

This application claims the priority of German Patent Application, Ser. No. 101 06 915.4, filed Feb. 15, 2001, the subject matter of which is incorporated herein by reference.

BACKGROUND OF THE INVENTION

The present invention relates, in general, to a suspension for a motor vehicle.

The suspension of the chassis of a motor vehicle is used to couple the vehicle body and the wheel support assembly in an elastic manner. The suspension is intended to insulate the vehicle body from high-frequency vibrations of the wheels and at the same time flexes to absorb the long-wave road surface contour. Various suspension systems are known in the art. Besides the use of leaf springs, which find application mostly in trucks, it is also known to employ torsion bar springs, pneumatic springs as well as silent blocks. Oftentimes, conventional suspension systems employ compression-type coil springs which are able to realize progressive, degressive or linear spring rate through provision of different wire sizes and different configurations. A particular space-saving configuration can be implemented, when using barrel springs which have windings which are nested within one another during compression. In addition to these types of coil springs, called load-carrying springs, auxiliary slave springs have been used to provide a stop in parallel disposition to the load-carrying spring. Typical materials for slave springs are rubber or cellular polyurethane elastomers. The slave spring may also operate as spring buffer to prevent an inadvertent bottoming of the coil spring. Conventionally, the slave springs are arranged outside the load-carrying spring and held in a cup-shaped receptacle.

It is also known to use a spring plate to correctly position the load-carrying spring, and to arrange a spring washer between the load-carrying spring and the spring plate. The spring washer is normally made of rubber, but may also be made of galvanized metal sheet or surface-coated metal sheet, and is used as sacrificial anode to prevent corrosion of the load-carrying spring.

When arranging the slave spring in coaxial relationship to the load-carrying spring, the installation is complex because of the need to place in a tight space three different components, i.e., first, the cup-shaped receptacle with the slave spring for attachment to the spring plate, second, the spring washer arranged between the spring plate and the load-carrying spring, and third, the actual load-carrying spring. While the slave spring and the receptacle may be constructed to form a pre-fabricated unit, the load-carrying spring and the spring washer constitute single parts which only in the spring-loaded installation stage are correctly positioned. Handling of the single parts is difficult during installation, especially when taking into account their considerable weight.

It would therefore be desirable and advantageous to provide an improved suspension which obviates prior art shortcomings and which is easy to handle during installation and allows use of light-weigh materials.

SUMMARY OF THE INVENTION

According to one aspect of the present invention, a suspension includes a load-carrying spring having one end indirectly supported via a first spring washer by a vehicle body component and another end indirectly supported via a second spring washer by a component of the wheel support assembly of a motor vehicle; a cup-shaped receptacle disposed at the one end of the load-carrying spring; an abutment disposed at the other end of the load-carrying spring and having a stop surface; and a slave spring disposed in coaxial relationship to the load-carrying spring and having one end received in the receptacle and another end intended for engagement with the stop surface of the abutment, wherein the receptacle and/or the abutment has a radially outwardly extending support ring for at least partially engaging behind the proximal one of the first and second spring washers at a side distal to the load-carrying spring.

For convenience and sake of simplicity, the following description may on occasion refer only to the area of the receptacle, when in fact the connection of the abutment on the confronting side is substantially a mirror image of the connection and placement of the receptacle about an imaginary horizontal medial plane. Thus, although the suspension may be described with respect to only the area of the receptacle, it will be understood that the same components of the suspension may also be duplicated on the side of the abutment, or vice versa.

The present invention resolves prior art problems by providing the receptacle and/or the abutment with a support ring to engage behind the respectively proximate spring washer on the load-carrying spring distal side, so that the receptacle with the slave spring and the one spring washer and/or the abutment and the other spring washer form a pre-fabricated unitary structure, respectively. The final installation can thus cope with fewer components to thereby significantly facilitate the assembly. Of course, the receptacle as well as the abutment may each be provided with such a support ring.

The suspension according to the present invention is advantageous in particular in those situations, when the load-carrying spring is configured as a barrel spring with reduced winding diameter at the ends. In this case, the support ring can be configured with an outer diameter which is only slightly greater than the winding diameter of the end turn to ensure a secure clamping of the spring washer between the load-carrying spring and the support ring. The use of support rings with comparably smaller outer diameter saves material and thus weight and as a result leads to reduced fuel consumption.

According to another feature of the present invention, the spring washers may each have a collar to bear radially outwards upon the receptacle and/or the abutment, respectively, and points in a direction of the load-carrying spring, for correctly positioning the respective end of the load-carrying spring in a radial direction in cooperation with the receptacle and/or the abutment, respectively. The receptacle thus assumes several functions. The load-carrying spring indirectly rests via the spring washer against the support ring of the receptacle whereby the receptacle at the same time correctly positions the one end of the load-carrying spring in radial direction. The need for central guide pins or the like, as required for barrel springs, is eliminated. The provision of the collar, directed toward the load-carrying spring, prevents wear and noise generation between the load-carrying spring and the receptacle. The collar has a height which corresponds suitably at least to the wire diameter of the end turn of the winding. The abutment assumes the same functions as the receptacle in concert with the other spring washer and also provides a correct disposition of the load-carrying spring.

Apart from the fact that the spring washer at the side of the receptacle and the slave spring may form a prefabricated unitary structure, it is also suitable when this unitary structure is captivated by the load-carrying spring. This can be realized by providing the collar with a radially inwardly pointing undercut for engagement of an end turn of the load-carrying spring. As a consequence of the spring force applied by the load-carrying spring, the end turn is snapped in forced engagement with the undercut. Thence, the collar and thus the spring washer assembly are pressed radially on the outside against the receptacle so that these components can be installed as a whole. The undercut can be so positioned that the spring washer is also pressed in axial direction against the support ring of the receptacle by the load-carrying spring.

In the event, the spring washer is made of rubber or of a highly compliant elastomer, the provision of an undercut of the collar may be insufficient to properly secure load-carrying springs of substantial weight, the receptacle and/or the abutment may have an outer perimeter formed with an impression in an area of the collar. When the load-carrying spring is pre-assembled with the receptacle and the abutment, the last turn of the load carrying spring is able to press the collar into the impression that serves as undercut.

Wheel support components, such as, e.g., vehicle axles, may have several degrees of freedom. Thus, it is not always ensured that the slave spring strikes against the stop surface of the abutment with coincident longitudinal center axes, i.e. that the end faces of the slave spring and the abutment contact one another in parallel relationship. Thus, in accordance with another feature of the present invention, the stop surface of the abutment is defined by a surface normal which deviates from the longitudinal center axis of the load-carrying spring. In a relaxed state, the longitudinal center axis of the load-carrying spring coincides with the longitudinal center axis of the slave spring. In the event the suspension is compressed in an oblique way, the surface normal of the stop surface is so oriented in dependence on the vehicle type and the configuration of the frame that the surface normal substantially coincides with the longitudinal center axis of the load-carrying spring during impact of the slave spring. Thus, almost exclusively normal forces act in the slave spring. Bending forces, which can influence the spring rate, are eliminated. As a consequence, the service life of the slave spring is enhanced and the overall suspension is better balanced.

Of course, it is also possible, to provide the end face of the slave spring, confronting the stop surface of the abutment, with a respective inclination to ensure a substantially parallel impacting of the slave spring upon the stop surface.

According to another feature of the present invention, the stop surface of the abutment may be curved concavely. This may be suitable in particular when the slave spring is made of rubber or polyurethane elastomers, because an additional centering upon the surface normal of the stop surface is realized.

Whereas conventional abutments are typically made of steel, according to another feature of the present invention, the receptacle and/or the abutment can be made of plastic, resulting in a significant weight reduction.

According to another feature of the present invention, the abutment may have a mounting pin for engagement in an opening of the vehicle body or the wheel support assembly. The mounting pin engages substantially free of play into the opening to ensure a reliable guidance of the abutment and thus of the load-carrying spring. Suitably, the mounting pin may have an outer periphery formed with at least one clamping rib so as to firmly retain the abutment in the opening. In particular, when the abutment is made of a material which is softer than the material of the involved wheel support component or the vehicle body component, such as e.g. plastic, the clamping rib may wear off during insertion in the opening to thereby ensure a firm seat of the mounting pin and thus of the abutment in the opening.

In addition to or as an alternative to the provision of one or more clamping ribs, the mounting pin may have several resilient clamping hooks with a radially outwardly directed nose for engagement behind edges of the opening. The nose is suitably formed with a slanted surface for allowing the hook to slide during installation into the opening. The spring-loaded hooks snap behind the edges of the opening, which are facing away from the load-carrying spring, in the locked position, so that the abutment is firmly clamped to the vehicle body or the wheel support assembly.

When the opening has a circular configuration, the installation of the abutment requires a correct disposition of the stop surface of the abutment. This can be realized by securing the abutment against executing a rotational motion, e.g. by providing the mounting pin with an alignment rib on its outer periphery for engagement in a complementary recess on the edge of the opening. Of course, the reverse configuration is conceivable as well, i.e., to provide the mounting pin with a circumferential recess for engagement by a complementary protrusion projecting from the edge of the opening. Other anti-rotation configurations are certainly possible as well and are considered covered by the present invention, such as, e.g., the provision of a particular shape of the opening that allows only one placement of the abutment. Other anti-rotation configurations may be disposed outside the opening, for example, the provision of a pin arranged on the support ring for engagement in an additional bore in the wheel support component or the vehicle body.

The overall weight can be further reduced by making the abutment as an injection-molded part of plastic, with the mounting pin constructed as a hollow pin. The mounting pin may have a diameter which is different from the outer diameter of the abutment, whereby the diametrical deviation can be bridged by a number of reinforcing ribs. This further reduces the weight. An even further weight reduction can be realized through recessing the receptacle at the side facing away from the load-carrying spring.

Weight can also be decreased by providing the spring washers on the side which is distal to the load-carrying spring with a latticed structure along certain areas. Through varied configuration of the latticed structure, the spring rate of the suspension can be additionally influenced. Possible parameters include number, disposition and geometric configuration of the indentations within the latticed structure, and chosen material.

According to another feature of the present invention, the load-carrying spring distal side of the spring washers and the load-carrying spring distal side of the support ring extend in a same plane. Thus, the spring washer affords space for the support ring, whereby the afore-described latticed structure extends suitably from the outer edge of the support ring to the outer edge of the spring washer.

According to another feature of the present invention, the load-carrying spring is configured as a barrel spring and has a winding diameter which is smaller at the ends of the load-carrying spring.

According to another feature of the present invention, the load-carrying spring has an inconsistent wire diameter.

Suitably, the wire diameter decreases towards the ends. Apart from the variation of the winding diameter and the wire diameter, the spring characteristic of the suspension can be influenced also by the configuration of the slave spring. When the slave spring is made of solid material, in particular of rubber or polyurethane elastomer, the spring characteristic is somewhat steeper, although the steepness could be flattened through material-saving construction, in particular through provision of a substantially cylindrical hollow spring. The slave spring may have a barrel-like cross section or cylindrical cross section or also a wedge-shaped configuration. The actual configuration can be best suited to the desired spring properties under consideration of the height and diameter of the receptacle or the ratio of height and diameter of the receptacle.

The receptacle may have one or more circumferential reinforcing grooves and may terminate in an outwardly pointing edge to prevent damage to the slave spring, when the slave spring is made of elastomer and compressed obliquely.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals.

Figure 1:
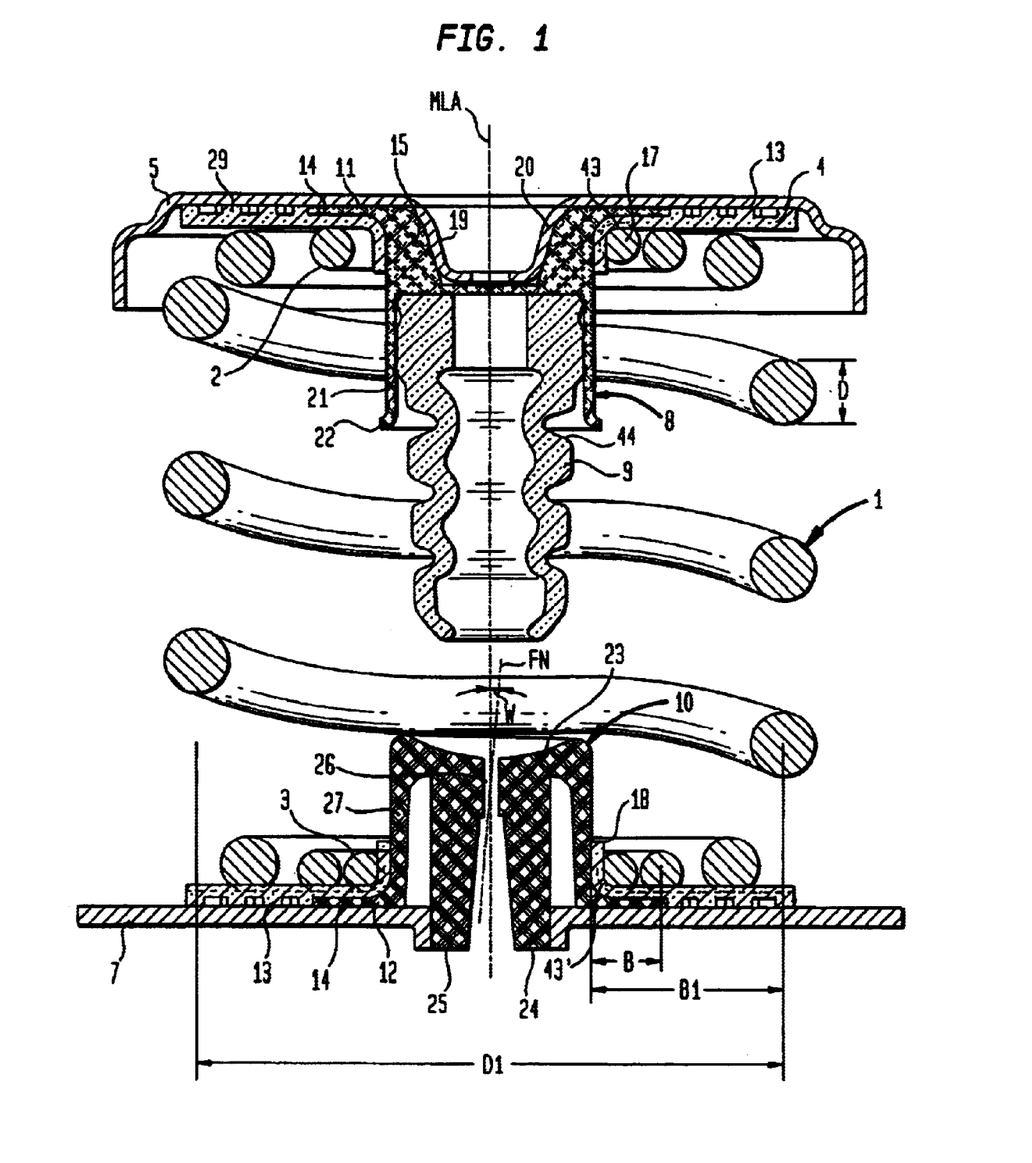
FIG. 1 is a longitudinal section of a suspension according to the present invention.

Turning now to the drawing, and in particular to FIG. 1, there is shown a longitudinal section of a suspension according to the present invention, including a load-carrying spring generally designated by reference numeral 1 and constructed as compression-type coil spring. The load-carrying spring 1 has an inconsistent wire diameter D and a winding diameter D1 which decreases toward the ends 2, 3. In the non-limiting example of FIG. 1, the load-carrying spring 1 is partially compressed, with their end turns coiled within one another.

The upper end 2 of the load-carrying spring 1, as viewed in the drawing plane, is supported indirectly via a ring-shaped spring washer 4 by a spring plate 5 which is part of a, not shown, vehicle body of a motor vehicle. The other end 3 of the load-carrying spring 1 engages indirectly via a ring-shaped spring washer 6 a wheel support component 7, which is part of a, not shown, wheel support assembly. The load-carrying spring 1 is defined by a longitudinal center axis MLA, with a slave spring 9 being disposed in coaxial relationship to the longitudinal center axis MLA and received in a cup-shaped receptacle 8 positioned at the upper end 2 of the load-carrying spring 1. An abutment 10 also disposed in coaxial relationship to the longitudinal center axis MLA is disposed the lower end 3 of the load-carrying spring 1 and has a stop surface 23 in confronting relationship to the slave spring 9.

The receptacle 8 has a main body in the form of a central shaft 15 and a cup-shaped cylindrical retainer 21 which extends inwardly from the shaft 15 for receiving one end of the slave spring 9. The main body of the receptacle 8 extends centrally through the spring washer 4. Projecting radially outwards from the shaft 15 is a support ring 11 to engage behind the spring washer 4. In analogous manner, the abutment 10 has a main body 27 to extend through the spring washer 6 and has a support ring 12 which projects radially outwards from the main body 27 to engage behind the spring washer 6. The support rings 11, 12 have each a width B which is smaller than half the width B1 of the spring washers 4, 6. On their side 13 distal to the load-carrying spring 1, the spring washers 4, 6 have ring-shaped recesses 14 for receiving the support rings 11, 12 so that the support rings 11, 12 and the sides 13 of the spring washers 4, 5 rest in parallel relationship to the spring plate 5 and the wheel support component 7.

The spring washer 4, which is traversed centrally by the shaft 15 of the receptacle 8, includes a collar 16 which is turned inwardly and points in the direction of the load-carrying spring 1 to radially bear against the shaft 15. The collar 16 has a height which is at least as thick as the last turn of the winding 17 of the load-carrying spring 1 at the end 2. Likewise, the abutment 10 is formed with a collar 18 which is turned inwardly and points in the direction of the load-carrying spring 1 to radially bear against the main body 27. The collar 18 has a height which is at least as thick as the last turn of the winding 17 of the load-carrying spring 1 at the end 3 and may be formed therein with a radially inwardly directed undercut 43'.

As shown in FIG. 1 at the right hand upper quarter, the winding 17 bears sufficiently firm against the collar 16 to squeeze the collar 16 against the shaft 15 of the receptacle 8. The collar 16 is made of compliant material and may be formed therein with a radially inwardly directed undercut 43 for engagement of the end turn of the winding 17 of the load-carrying spring 1. The clamped engagement of the end turn of the winding 17 upon the receptacle 8 via the collar 16 allows the formation of a pre-fabricated unitary structure of the load-carrying spring 1 and the receptacle 8 with the slave spring 9 and the spring washer 4, which unitary structure can be mounted as a whole to the spring plate 5 of the vehicle body.

For reducing the weight, the receptacle 8 is formed with a recess 19 in the area of the shaft 15 at the side distal to the slave spring 9 for engagement of a centering pin 20 of the spring plate 5 in the non-limiting example of FIG. 1.

The slave spring 9 is secured at one end within the cylindrical retainer 21 which terminates in an outwardly pointing edge 22. The slave ring 9 is made of rubber or of a polyurethane elastomer and has a substantially cylindrical configuration with spaced-apart outer annular notches 44. Of course, the slave spring 9 may be made of other suitable material as well.

As the load-carrying spring 1 is compressed, the slave spring 9 is: indented to strike the stop surface 23 of the abutment 10 as vertical as possible. In the non-limiting example of FIG. 1, the stop surface 23 is curved concavely and defines a central surface normal FN which extends at an angle W to the central longitudinal axis MLA of the load-carrying spring 1, when the load-carrying spring 1 is relaxed or preloaded, as shown in FIG. 1. The angle W between the central longitudinal axis MLA of the load-carrying spring 1 and the surface normal FN is selected in dependence on the installation situation at hand and the kinematics of the axle in the motor vehicle and allows a substantial vertical impact of the slave spring 9 upon the abutment 10, when the suspension is compressed slantingly.

The abutment 10 is formed at the side distal to the stop surface 23 with a mounting pin 24 for engagement in an opening of the wheel support component 7 to thereby correctly position the abutment 10. The mounting pin 24 is formed in the direction of the central longitudinal axis MLA of the load-carrying spring 1 with a central elongate channel 26 which terminates in the stop surface 23. The mounting pin 24 is arranged concentric at radial distance to a substantially outer surface area of the main body 27, with the outer surface area of the main body 27 carrying the support ring 12 on one end and demarcating the stop surface 23 on the other end.

Figure 2:
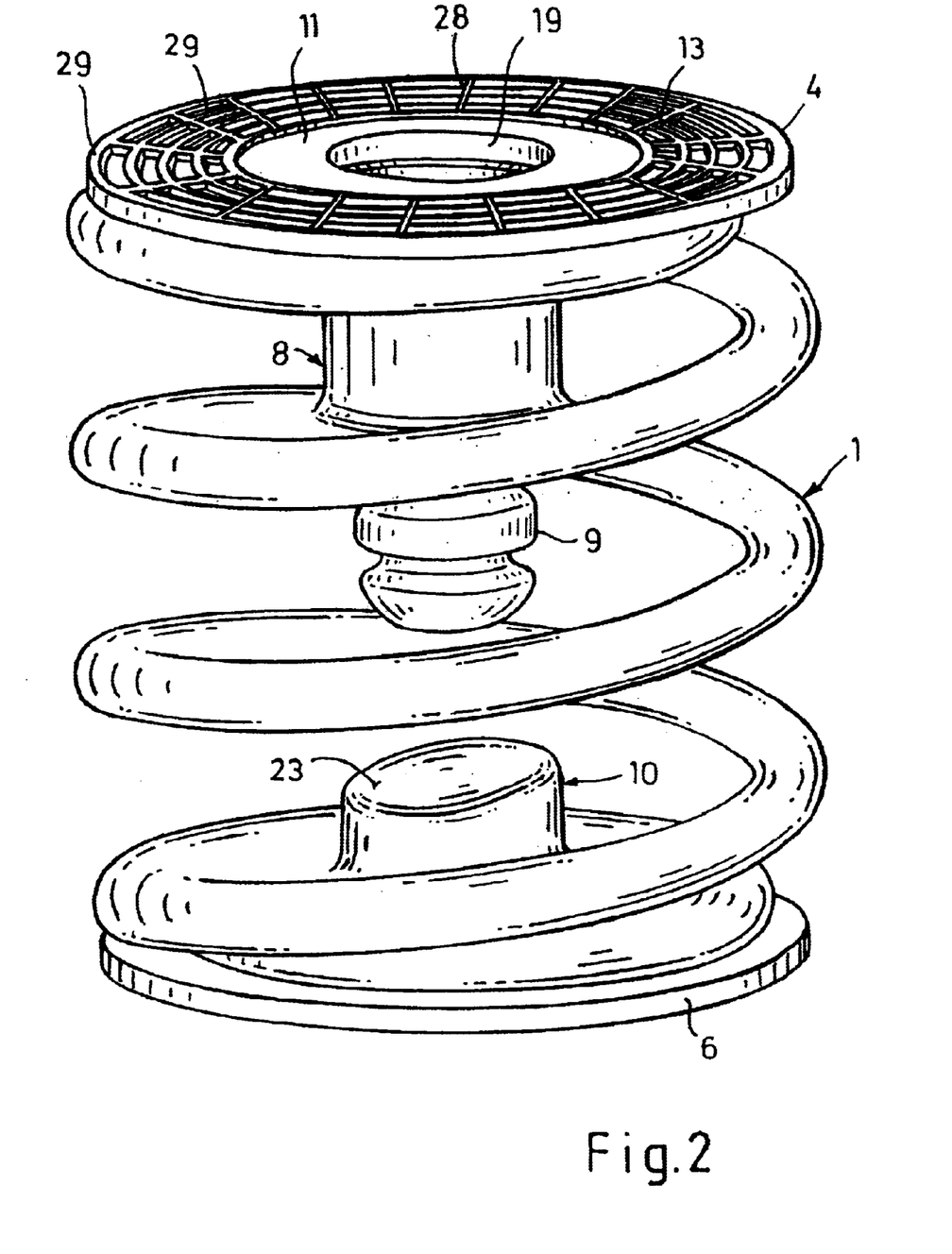
FIG. 2 is a perspective illustration of the suspension.

Referring now to FIG. 2, there is shown a perspective illustration of the suspension of FIG. 1, without attachment to the spring plate 5 and the wheel support component 7. This rear perspective view onto the load-carrying spring 1 distal side 13 of the spring washer 4 depicts a lattice-like configuration of the side 13. The latticed side 13 has evenly spaced radial webs 28 and concentric rings 29. The distance of the radial webs 28 and the rings 29 is determinative for the spring rate of the spring washer 4 as well as for the possible weight reduction of the spring washer 4. The spring washer 6 upon the abutment 10 is also formed with such a latticed configuration, as shown by way of the cross section of FIG. 1.

Figure 3:
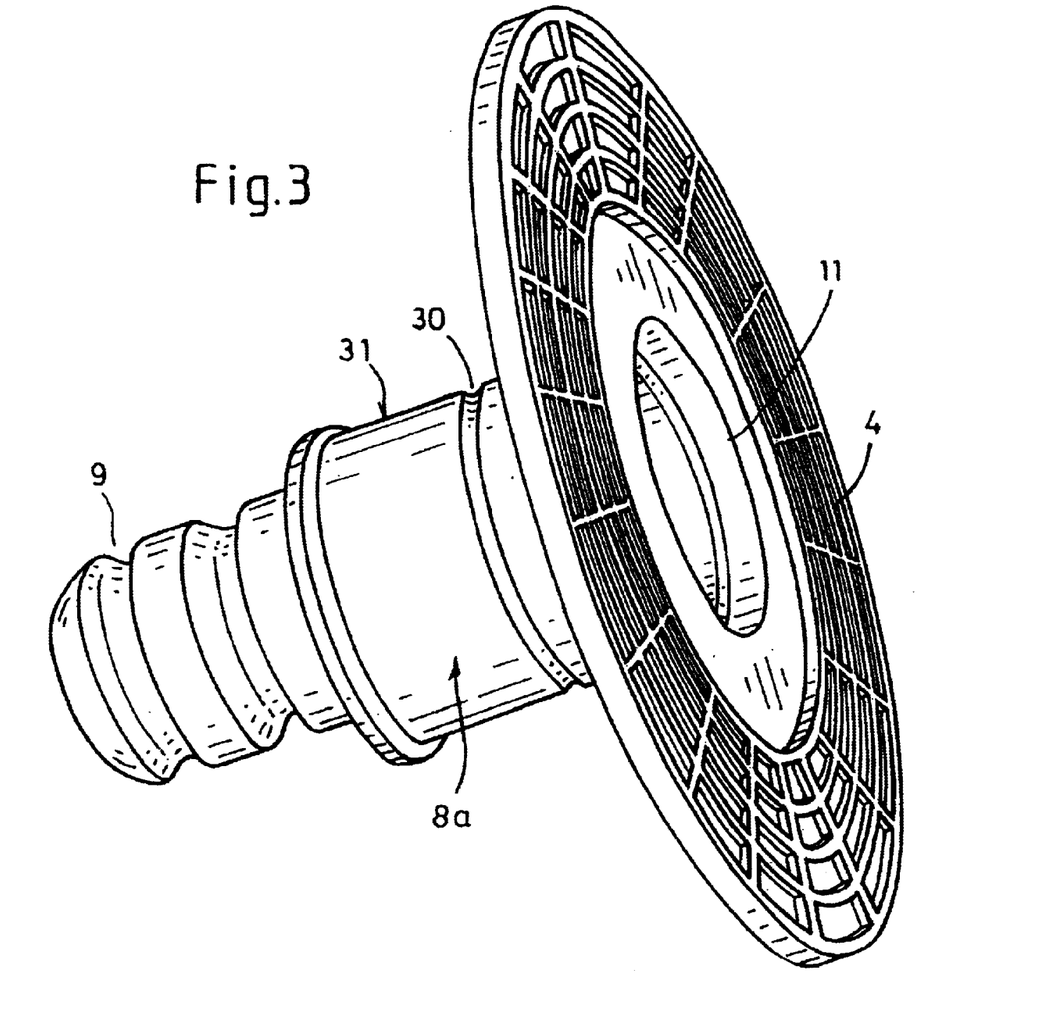
FIG. 3 is a perspective illustration of a cup-shaped receptacle together with a spring washer for the suspension.
Figure 4:
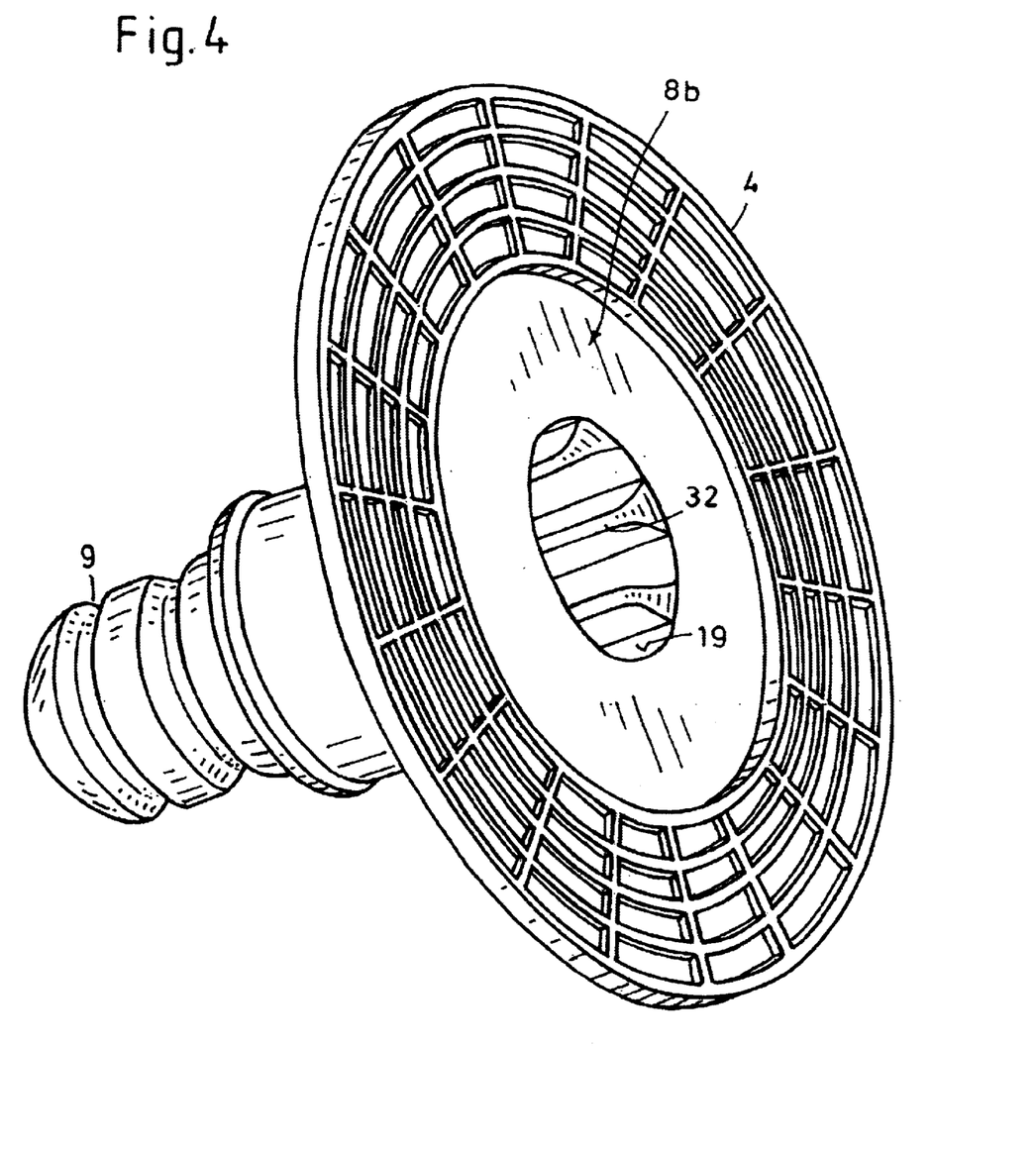
FIG. 4 is a perspective illustration of a variation of a cup-shaped receptacle together with a spring washer for the suspension.

FIGS. 3 and 4 show perspective views of two possible embodiments of a receptacle with the spring washer 4. In FIG. 3, the receptacle, designated 8a here, is made of steel or an aluminum alloy and has an outer surface area 31 which is formed with an inwardly directed impression 30 for providing a stiffening of the receptacle 8a. In FIG. 4, the receptacle, designated 8b here, is made of plastic and differs from the receptacle 8a in that the load-carrying spring distal side is formed in the area of the recess 19 with radially inwardly pointing reinforcement ribs 32.

Figure 5:
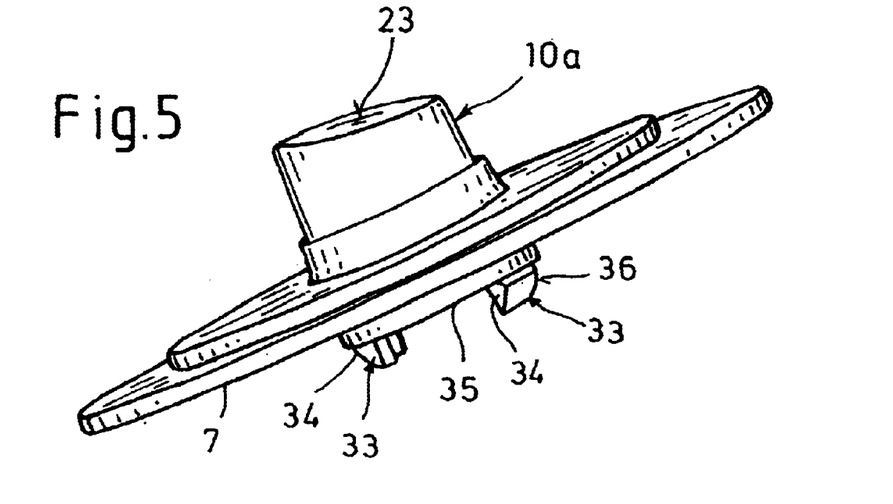
FIG. 5 is a perspective illustration of an abutment of the suspension for attachment to a wheel support assembly.

FIGS. 5 and 6 show perspective views of two possible embodiments of an abutment. In FIG. 5, the abutment, designated 10a here, is held by a clip mechanism in the opening 25 of the wheel support component 7. Hereby, the mounting pin 24, not visible in this illustration, is provided about its circumference with several, spaced-apart resilient clamping hooks 33 which have radially outwardly directed noses 34 for latched engagement behind the edges 35 of the opening 25. The noses 34 have each an oblique surface 36, which extends outwardly at a slant, for facilitating insertion of the abutment 10 into the opening 25.

Figure 6:
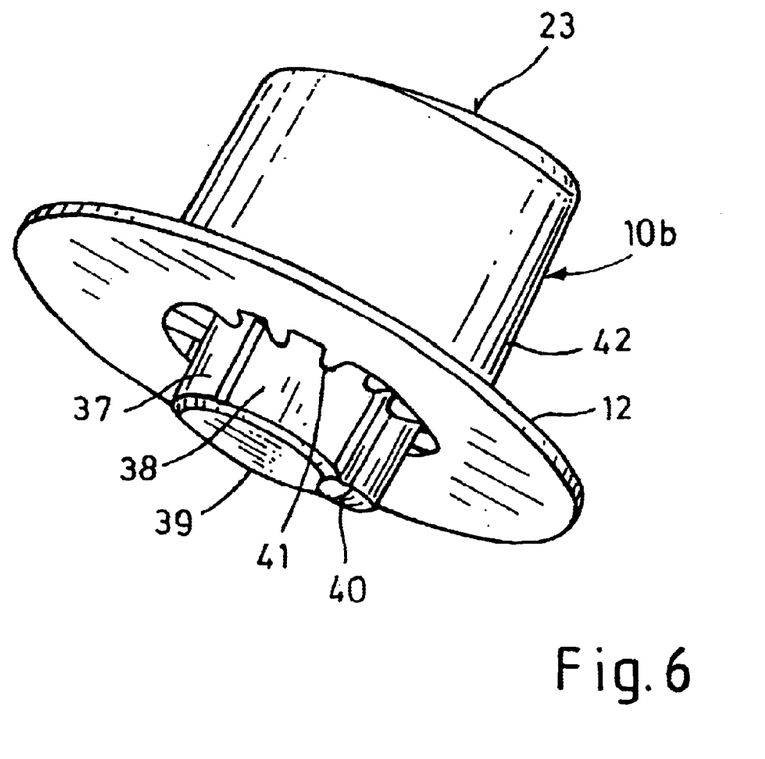
FIG. 6 is a perspective illustration of a variation of an abutment.

In FIG. 6, the abutment, designated 10b here, is made of plastic and has a mounting pin 39 including a circumference 38 which is provided with axial clamping ribs 37. The clamping ribs 37 have a height sized to allow a certain abrasion during insertion of the abutment 10b in the opening 25 to thereby ensure a clamped engagement of the mounting pin 39 in the opening 25. In addition to the clamping ribs 37, the mounting pin 39 is formed with an axial alignment rib 40 which allows to establish the angular disposition of the abutment 10b in the opening 25. In the non-limiting example of FIG. 6, the alignment rib 40 has a pin-shaped configuration with a round cross section and engages in a complementary recess in the opening 25, when installed. FIG. 6 further shows the provision of radial reinforcement ribs 41 for stiffening the abutment 10b. The stiffening ribs 41 project in level with the outer surface area 42 therefrom toward the mounting pin 39.

While the invention has been illustrated and described as embodied in a suspension, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A suspension, comprising:
    a load-carrying spring having opposite ends, with one end indirectly supported via a first spring washer by a component of a vehicle body of a motor vehicle and with the other end indirectly supported via a second spring washer by a wheel support assembly of the motor vehicle;
    a cup-shaped receptacle disposed at the one end of the load-carrying spring;
    an abutment disposed at the other end of the load-carrying spring and having a stop surface, wherein the stop surface of the abutment is curved concavely; and
    a slave spring disposed in coaxial relationship to the load-carrying spring and having one end received in the receptacle and another end intended for engagement with the stop surface of the abutment,
    wherein at least one member selected from the group consisting of receptacle and abutment has a radially outwardly extending support ring for at least partially engaging behind the proximal one of the first and second spring washers at a side distal to the load-carrying spring.

2. The suspension of claim 1, wherein the load-carrying spring is a compression-type coil spring.

3. The suspension of claim 1, wherein the stop surface of the abutment is defined by a surface normal which deviates from a longitudinal center axis of the load-carrying spring.

4. The suspension of claim 1, wherein the member is made of plastic.

5. The suspension of claim 1, wherein the abutment is secured against executing a rotational motion.

6. The suspension of claim 1, wherein at least one of the first and second spring washers has a side which is distal to the load-carrying spring and has at least one area formed with a latticed structure.

7. The suspension of claim 1, wherein the load-carrying spring has a winding diameter which becomes smaller at the ends of the load-carrying spring.

8. The suspension of claim wherein the load-carrying spring has an inconsistent wire diameter.

9. The suspension of claim 1, wherein the receptacle end has a radially outwardly directed edge at an end confronting the abutment.

10. The suspension of claim 1, wherein the first spring washer has a collar bearing radially from outside upon the receptacle and pointing in a direction of the load-carrying spring for positioning the one end of the load-carrying spring in a radial direction in cooperation with the receptacle.

11. The suspension of claim 10, wherein the second spring washer has a collar bearing radially from outside upon the abutment and pointing in a direction of the load-carrying spring for positioning the other end of the load-carrying spring in a radial direction in cooperation with the abutment.

12. The suspension of claim 11 wherein the collar of the first spring washer has a radially inwardly pointing undercut for engagement of an end turn of the one end of the load-carrying spring, and the collar of the second spring washer has a radially inwardly pointing undercut for engagement of an end turn of the other end of the load-carrying spring.

13. The suspension of claim 11, wherein the member has an outer perimeter formed with an impression in an area of the proximal one of the collars.

14. A suspension, comprising:

a load-carrying spring having opposite ends, with one end indirectly supported via a first spring washer by a component of a vehicle body of a motor vehicle and with the other end indirectly supported via a second spring washer by a wheel support assembly of the motor vehicle;

a cup-shaped receptacle disposed at the one end of the load-carrying spring;

an abutment disposed at the other end of the load-carrying spring and having a stop surface; and a slave spring disposed in coaxial relationship to the load-carrying spring and having one end received in the receptacle and another end intended for engagement with the stop surface of the abutment, wherein at least one member selected from the group consisting of receptacle and abutment has a radially outwardly extending support ring for at least partially engaging behind the proximal one of the first and second spring washers at a side distal to the load-carrying spring, wherein the abutment has a mounting pin for engagement in an opening of the wheel support assembly, said mounting pin having an outer circumference formed with at least one clamping rib.

15. A suspension, comprising:

a load-carrying spring having opposite ends, with one end indirectly supported via a first spring washer by a component of a vehicle body of a motor vehicle and with the other end indirectly supported via a second spring washer by a wheel support assembly of the motor vehicle;

a cup-shaped receptacle disposed at the one end of the load-carrying spring;

an abutment disposed at the other end of the load-carrying spring and having a stop surface; and a slave spring disposed in coaxial relationship to the load-carrying spring and having one end received in the receptacle and another end intended for engagement with the stop surface of the abutment, wherein at least one member selected from the group consisting of receptacle and abutment has a radially outwardly extending support ring for at least partially engaging behind the proximal one of the first and second spring washers at a side distal to the load-carrying spring, wherein the abutment has a mounting pin for engagement in an opening of the wheel support assembly, said mounting pin having several clamping hooks with radially outwardly directed noses for engagement behind an edge of the opening.

16. A suspension, comprising:

a load-carrying spring having opposite ends, with one end indirectly supported via a first spring washer by a component of a vehicle body of a motor vehicle and with the other end indirectly supported via a second spring washer by a wheel support assembly of the motor vehicle;

a cup-shaped receptacle disposed at the one end of the load-carrying spring;

an abutment disposed at the other end of the load-carrying spring and having a stop surface; and a slave spring disposed in coaxial relationship to the load-carrying spring and having one end received in the receptacle and another end intended for engagement with the stop surface of the abutment, wherein at least one member selected from the group consisting of receptacle and abutment has a radially outwardly extending support ring for at least partially engaging behind the proximal one of the first and second spring washers at a side distal to the load-carrying spring, wherein the proximal one of the spring washers has a side which is distal to the load-carrying spring, and the support ring has a side which is distal to the load-carrying spring and extends in a same plane as the side of the proximal one of the spring washers.

17. A suspension, comprising:

a load-carrying spring having opposite ends, with one end indirectly supported via a first spring washer by a component of a vehicle body of a motor vehicle and with the other end indirectly supported via a second spring washer by a wheel support assembly of the motor vehicle;

a cup-shaped receptacle disposed at the one end of the load-carrying spring;

an abutment disposed at the other end of the load-carrying spring and having a stop surface; and a slave spring disposed in coaxial relationship to the load-carrying spring and having one end received in the receptacle and another end intended for engagement with the stop surface of the abutment, wherein at least one member selected from the group consisting of receptacle and abutment has a radially outwardly extending support ring for at least partially engaging behind the proximal one of the first and second spring washers at a side distal to the load-carrying spring, wherein the abutment is an injection-molded plastic part formed with a hollow mounting pin for engagement in an opening of the wheel support assembly.

* * * * *

UNITED STATES PATENT AND TRADEMARK OFFICE
CERTIFICATE OF CORRECTION

PATENT NO. : 6,733,023 B2
DATED : May 11, 2004
INVENTOR(S) : Heiner Remmert and Andreas Rohde It is certified that error appears in the above-identified patent and that said Letters Patent is hereby corrected as shown below:

Column 8,
Line 1, after "claim" insert -- 1, --

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,733,023 B2 | Page 1 of 1 |
| APPLICATION NO. | : 10/077598 | |
| DATED | : May 11, 2004 | |
| INVENTOR(S) | : Heiner Remmert and Andreas Rohde | |

It is certified that error appears in the above-identified patent and that said Letters Patent is hereby corrected as shown below:

<u>Column 8,</u>
Line 57, after "claim" insert -- 1, --

This certificate supersedes the Certificate of Correction issued August 17, 2004.

Signed and Sealed this

Eighth Day of April, 2008

JON W. DUDAS
*Director of the United States Patent and Trademark Office*